(12) United States Patent
Ballard

(10) Patent No.: US 6,830,513 B1
(45) Date of Patent: Dec. 14, 2004

(54) COMPUTER-BASED PLAYER PERFORMANCE VARIATION

(75) Inventor: Clinton L. Ballard, Suquamish, WA (US)

(73) Assignee: Acceleration Corp., Poulsbo, WA (US)

( * ) Notice: Subject to any disclaimer, the term of this patent is extended or adjusted under 35 U.S.C. 154(b) by 0 days.

(21) Appl. No.: 10/445,243

(22) Filed: May 23, 2003

(51) Int. Cl.[7] .................................................. A63F 9/24
(52) U.S. Cl. ........................................ 463/14; 273/260
(58) Field of Search ........................... 463/1, 14, 9, 23, 463/42; 273/236–237, 260, 261

(56) References Cited

U.S. PATENT DOCUMENTS

| | | |
|---|---|---|
| 6,106,395 A | 8/2000 | Begis |
| 6,213,873 B1 | 4/2001 | Gasper et al. |
| 6,302,792 B1 | 10/2001 | Arai et al. |
| 2004/0065999 A1 * | 4/2004 | Syed et al. ................. 273/260 |
| 2004/0122534 A1 * | 6/2004 | Paulin ......................... 700/30 |

* cited by examiner

Primary Examiner—Kim Nguyen
(74) Attorney, Agent, or Firm—Steven P. Koda (57) ABSTRACT

Allowed actions of a computer-based player in a game are limited. A pre-action value is identified which corresponds to a relative advantage between the computer-based player and a real person player prior to a current action taken by the computer-based player. A post-action value is identified corresponding to the relative advantage between the computer-based player and the real person player after the current action taken by the computer-based player. The current action is limited to be among a set of allowed actions, which keep the post-action value at least as great as a threshold value. The current action of the computer-based player also may be limited to keep the post-action value not more than a tolerable value, where possible. The current action is selected from the set of allowed actions. The threshold value and tolerance value are prescribed, selected or varied over the course of the game.

33 Claims, 4 Drawing Sheets

COMPUTER-BASED PLAYER PERFORMANCE VARIATION

BACKGROUND OF THE INVENTION

The present invention is directed to computer gaming in which a player plays against a computer, and more specifically to methods and apparatus for setting and modifying performance of the computer-based player.

There are many games in which a real person player may play against a computer-based player. For example there are adventure games, role-playing games, strategy games, card games, and sports games implemented on a computer. The actions at least one player are controlled by a real person making user inputs to the computer through a keyboard, mouse, joy stick, gaming device or other input device. The person-controlled player plays against at least one other player/character, whose actions are controlled by a computer program. Such other player may merely be identified as the computer or may have a defined name or character.

In computer-based chess games, there are chess engines such as the WChess engine developed by Heuristic Programming Inc. of Mobile, Ala. which perform at the equivalent rating of a grandmaster chess player. To render a chess engine appropriate for use by ordinary players while still retaining the ability to defeat advanced players, there are systems that allow a user to define a skill level for the computer-based opponent. U.S. Pat. No. 6,213,873 issued Apr. 10, 2001 to Gasper et al. discloses a user-adaptable computer chess system. The computer player counters a player's moves with an effectiveness that is said to be marginally above the player's ability. In an opening book portion of the game, the computer based player follows a predetermined plan, including the making of specific mistakes. The computer corrects for a programmed mistake in future games once the real player takes advantage of the mistake. Once the preprogrammed moves portion has transpired, the game enters the midgame portion. For the midgame portion the computer-based player's moves are handicapped based upon the real player's performance against the computer in prior games. The computer-based player's style of play also may vary, such as between a 'heroic' style and a 'craven' style. Once there are only a prescribed number of players left on the game board, an end game portion commences. During the end game portion, the computer moves still are affected by the computer rating setting and the computer style of play setting.

U.S. Pat. No. 6,302,792 issued Oct. 16, 2001 to Arai et al. discloses a role-playing game. When a player's character first encounters an enemy character controlled by the computer, the level of the enemy character is calculated based on the current level of the player character. The set level of the enemy character is maintained during the game.

U.S. Pat. No. 6,106,395 issued Aug. 22, 1990 to Begis discloses an adaptive computer game in which a profile of a real person player is monitored and used in future games as a proxy player. A real person player can play against the computer controlled proxy player.

SUMMARY OF INVENTION

Allowed actions of a computer-based player in a game are limited. A pre-action value is identified which corresponds to a relative advantage between the computer-based player and a real person player prior to a current action taken by the computer-based player. A post-action value is identified corresponding to the relative advantage between the computer-based player and the real person player after the current action taken by the computer-based player. The current action is limited to be among a set of allowed actions, which keep the post-action value at least as great as a threshold value. The current action of the computer-based player also may be limited to keep the post-action value not more than a tolerable value, where possible. The current action is selected from the set of allowed actions. The threshold value and tolerance value are prescribed, selected or varied over the course of the game. The term action as in pre-action, post-action and action is used to encompass the nomenclature of the specific game embodiment, and thus is used to include decisions, moves, shots, rolls, plays, strokes, at bats, throws or another descriptive of an activity or choice performed by a player in a game. Similarly the term move is used interchangeably with the terms action, decision, shot, roll, play, stroke, at bat and throw according to the appropriate descriptive of the specific game embodiment.

DESCRIPTION OF SPECIFIC EMBODIMENTS

Host Computer System

Figure 1:
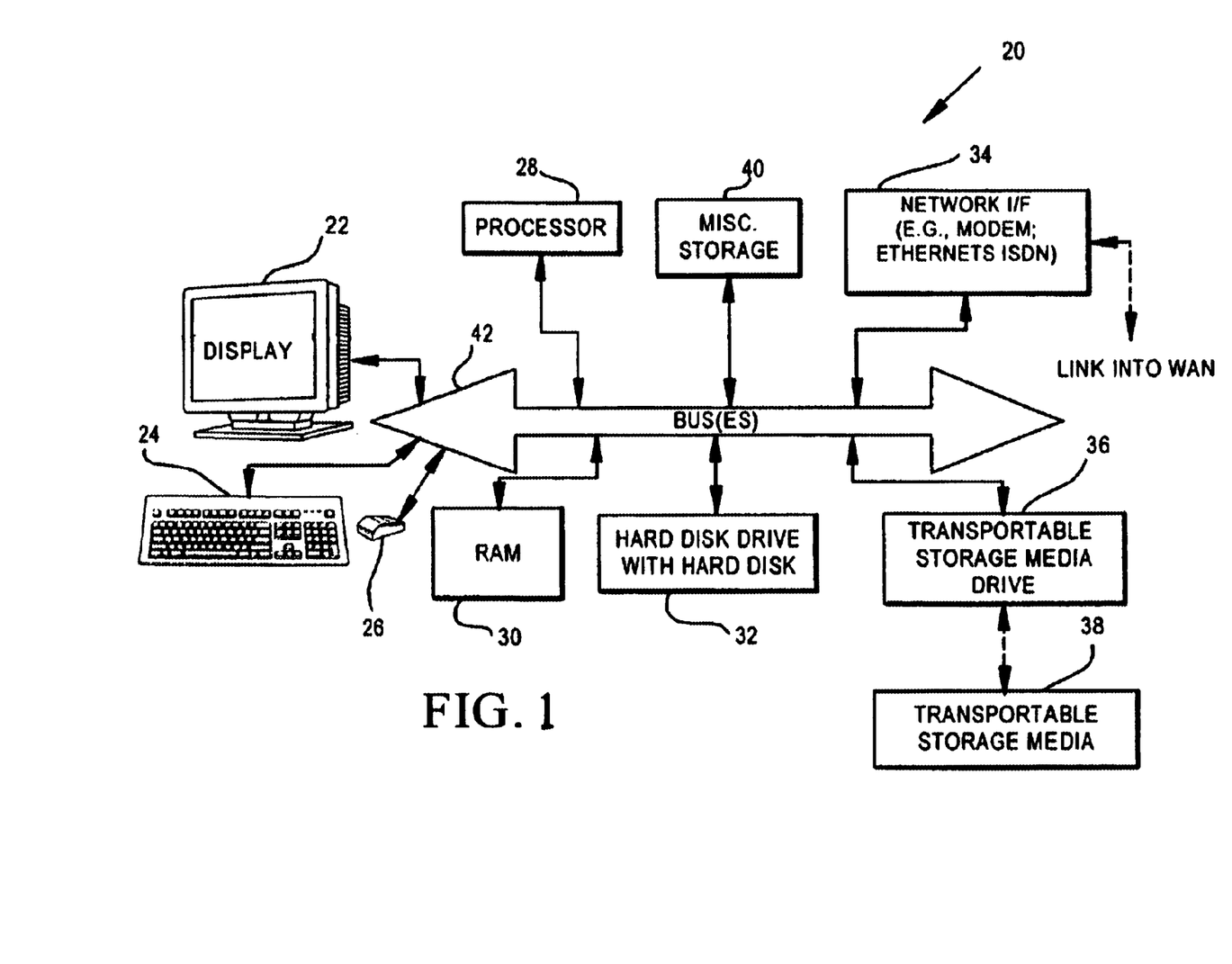
FIG. 1 is a block diagram of an embodiment of a computer system for hosting an embodiment of a computer-based game.

The functions of the present invention preferably are performed by an embedded gaming computer system, or a programmed digital computer. An exemplary host system includes a display 22, processor 28, memory and an input device. For a programmed digital computer 20, the system may include a key entry device 24 and a pointing/clicking device 26 as the input devices. The computer 20 also may include random access memory (RAM) 30 and a non-volatile storage device such as a hard disk drive 32 and/or a transportable storage media drive 36 which reads transportable storage media 38. Other miscellaneous storage devices 40, such as a floppy disk drive, CD-ROM drive, DVD drive, CD-RW drive, zip drive, bernoulli drive or other magnetic, optical or other storage media, may be included. The computer may also include a communication or network interface 34 (e.g., modem; ethernet adapter). The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may be configured as a workstation, personal computer, network server, or a reduced-feature network terminal device. An embedded gaming system host may include the processor 28, memory (volatile, such as RAM, and involatile, such as a game card or disk), the output display 22 and an input gaming device (e.g., joysticks, directional controls, button controls).

Overview

Figure 2:
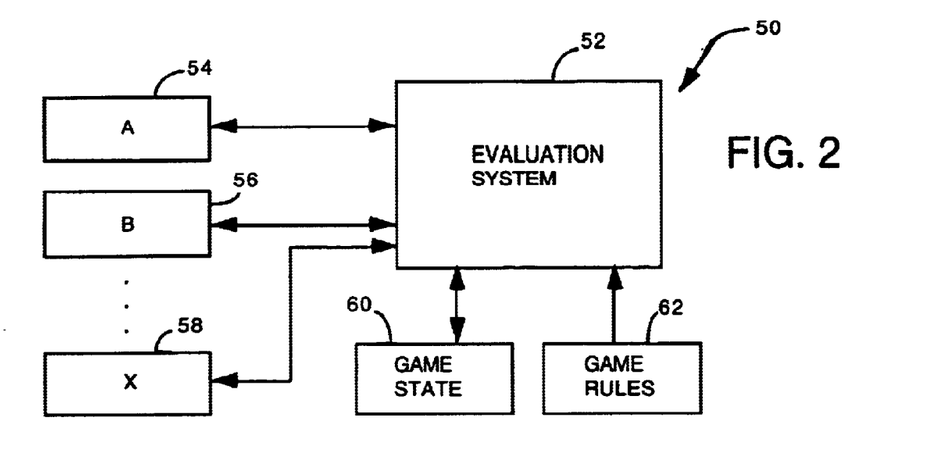
FIG. 2 is a block diagram of an embodiment of a computer game architecture.

Referring to FIG. 2, a computer-based game 50 includes an evaluation system 52, data sets for multiple players 54–58, a game state data base 60 and a game rules data base 62. Various games are implemented. In a chess embodiment there is one real person based player A and one computer-based player B. In other strategy game embodiments there are additional players X, either real or computer-based. In an adventure game or role playing game there typically are multiple computer-based characters B and one or more real person players A. In a sports game there are one or more computed-based players and one or more real person players. During game play, the evaluation system 52 relies on game rules to offer or evaluate proposed actions by the players 54–58. For computer-based players 56, the evaluation system identifies and evaluates the computer-based player's actions. At any time during the game, there is a game state 60. In a chess game, for example, the game state indicates the position of all pieces on the board, the player who has a move pending, and an evaluation of the relative advantage of one player of another. In chess the advantage is measured in pawn units. An advantage of +0.5 means a player has half a pawn advantage of the other player. An advantage of –1.0 means the player is trailing (i.e., has a disadvantage) by one pawn.

Figure 3:
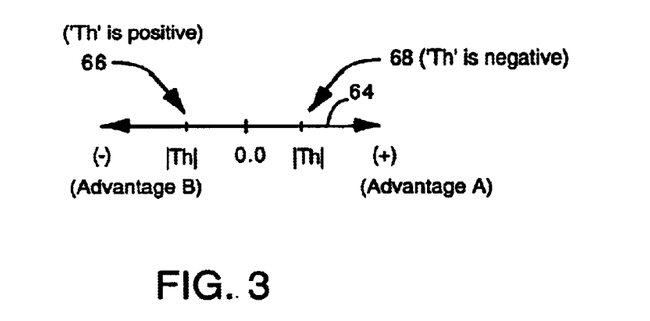
FIG. 3 is a graph of an embodiment of an advantage scale between a real person player and a computer-based player, including a threshold parameter.

To keep the game interesting, the computer-based player's 56 performance is adapted to vary. The evaluation system 52 determines which player has an advantage (e.g., is winning). A threshold parameter is used for screening the potential moves of the computer-based player. The computer player's allowed moves include those moves that keep the computer player's advantage to be no worse than the threshold value. Referring to FIG. 3, the relative advantage is measured along an axis 64. An advantage to player A is designated as the positive portion. An advantage to player B is designated as the negative portion. For example, an advantage of +1.0 means player A has a 1.0 advantage. An advantage of 1.0 means player A is trailing by 1.0, and conversely player B has a 1.0 advantage.

Consider the example of an even game where the advantage is 0.0. Consider the situation where it is the computer-based player's turn to move. The magnitude of the threshold value is designated as Th. For a negative threshold 68 the computer's allowed moves keep the computer player B from trailing by more than the threshold magnitude. For example, at threshold of –1.0 and the current advantage being 0.0, the computer player B is allowed any move that results in a post-move advantage to player B of no less than –1.0. This means the computer player B is allowed any move that either puts the computer player B at an advantage or that puts the computer player B at a disadvantage by not more than one pawn.

For a positive threshold 66 the computer's allowed moves keep or achieve a computer lead of at least the threshold magnitude. For example, for a threshold of 1.0 and the current advantage being 0.0, the computer is allowed any move that results in a post move advantage of at least one pawn for the computer player B. Where there are no allowed moves using such criteria, then the computer chooses among moves that keep the game closest to the threshold.

Figure 4:
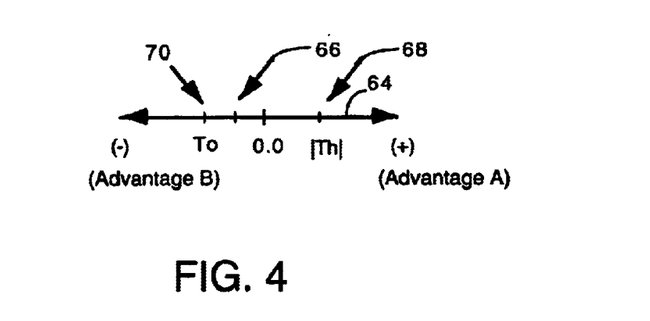
FIG. 4 is a graph of an embodiment of an advantage scale between a real person player and a computer-based player, including a threshold parameter and a tolerance parameter.

Referring to FIG. 4, a tolerance parameter, To, also is used for screening the potential moves of the computer-based player. While a negative threshold parameter 68 keeps the computer from trailing by more than the threshold magnitude, a positive tolerance 70 keeps the computer from achieving more than a tolerable lead. In such instance, the allowed moves keep the computer player B between a threshold deficit 68 and a tolerable lead 70. For a positive threshold 66 and positive tolerance 70, the tolerance is more positive than the threshold keeping the computer from achieving more than the tolerable lead. In such instance, the allowed moves keep the computer between a threshold lead 66 and a tolerable lead 70. In some embodiments the tolerance parameter may be selected to be not applicable. For example, an advanced player selecting a positive threshold 66 might desire to not limit the tolerable lead.

The chosen move for the computer-based player is selected randomly from among the allowed moves. In one embodiment the computer-based player's move is a random selection from all of the allowed moves. In another embodiment, the computer-based player's move is a random selection from a number ('N') of the allowed moves, where the value of N is prescribed, selected or varied over the course of the game. The N moves are selected in various manners. In one embodiment, the N moves are the N moves among the allowed moves that keep the computer player B nearest to the threshold. In another embodiment, the N moves are selected randomly from the allowed moves. In another embodiment, the N moves are the middle N moves of all allowed moves. In another embodiment the N moves are the N moves among the allowed moves that bring or keep the computer nearest to the tolerance parameter. In another embodiment, the N moves are every other one of the allowed moves. In another embodiment the N moves are the N moves that give the computer-based player the best advantage.

In some embodiments the method of selecting the N candidates changes during the course of the game based on any one or more of the following factors: transpiring of a set number of moves, every set number of moves, time duration since onset of game, periodically after each elapse of a prescribed time period. In addition or alternatively, the N value may be selected based on the current portion of the game, the current game scene, or a personality profile accorded to computer-based player.

In some embodiments, the tolerance parameter value varies over the course of the game based on any one or more of the following factors: transpiring of a set number of moves, every set number of moves, time duration since onset of game, periodically after each elapse of a prescribed time period. In addition or alternatively, the tolerance value may change based on the current portion of the game, the current game scene, or a personality profile accorded to computer-based player.

In some embodiments, the threshold value varies over the course of the game based on any one or more of the following factors: transpiring of a set number of moves, every set number of moves, time duration since onset of game, periodically after each elapse of a prescribed time period. In addition or alternatively, the threshold value may change based on the current portion of the game, the current game scene, a personality profile accorded to computer-based player.

In some embodiments the tolerance and/or threshold values vary over the course of the game at random. For example, the tolerance and/or the threshold values are set for a randomly determined number of moves, then change.

Chess Game Embodiment

A chess game embodiment is described with regard to FIGS. 2–5 in which a real person player A opposes a computer-based player B. In various embodiments the real person player's moves are communicated to the computer using an input device. For example, in a game with a visual presentation of the game board and chess pieces, the operator may do a "drag and drop" operation to a select a specific piece and move the piece to a desired location. The evaluation system 52 then uses the game rules 62 to evaluate whether the move is allowed. If so, the move is entered to alter the game state 60. In some embodiments, a timer is implemented to limit the time period for a player to make a move. In some embodiments the operator can select whether the computer player time is of significant duration or whether it is to follow automatically. After player A moves the relative advantage is recalculated by the evaluation system 52 based on conventional methods for identifying advantage in a chess game. Advantage is identified in units of one pawn. For example, an advantage of 0.25 means that one player currently has a one-quarter pawn advantage. For our purposes, a positive advantage corresponds to an advantage to player A and a negative advantage corresponds to a disadvantage to player (and conversely an advantage to the computer-based player B).

Figures 5, 6:
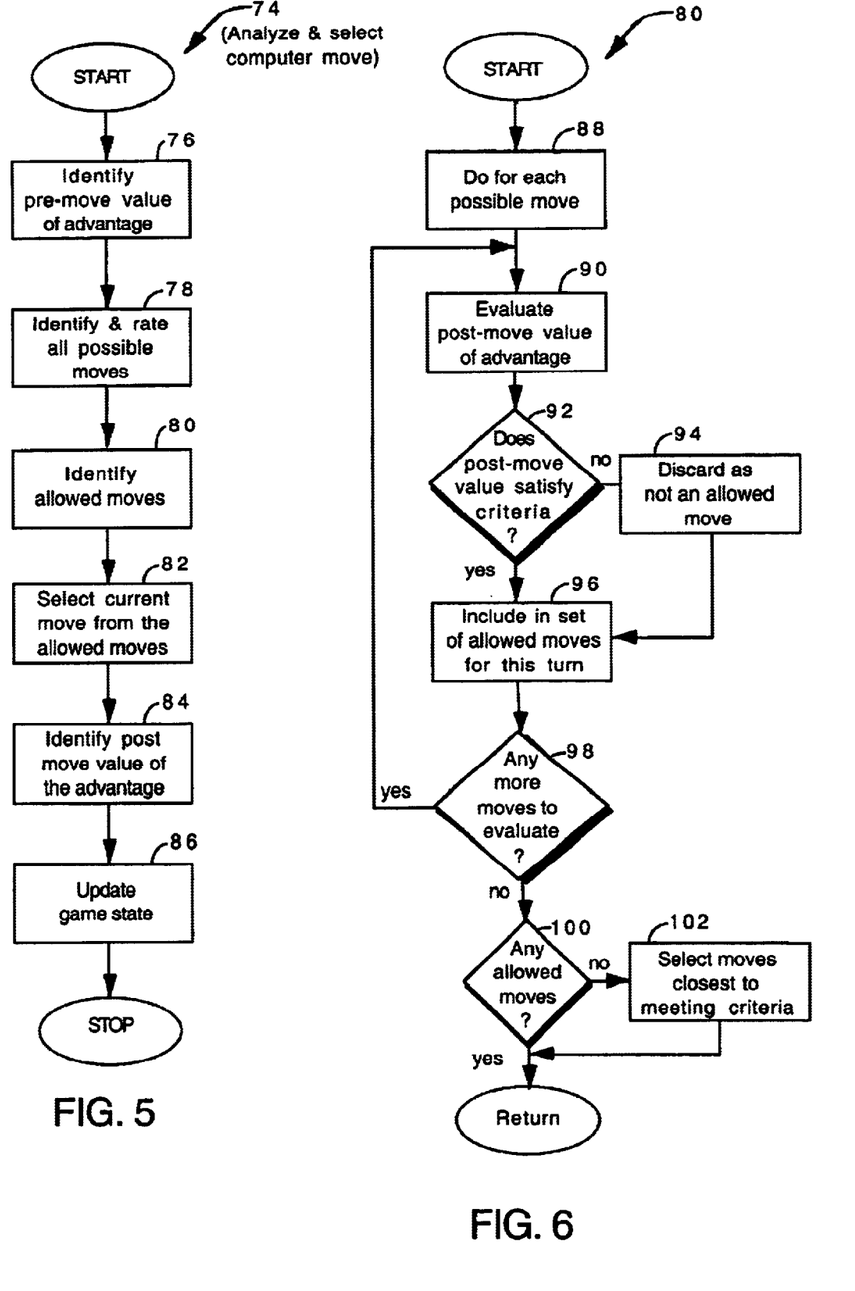
FIG. 5 is a flow chart of an embodiment of a method for analyzing and selecting a computer-based player move.
FIG. 6 is a flow chart of an embodiment of a method for identifying a set of allowed moves.

FIG. 5 is a flow chart 74 for analyzing and selecting a computer-based player's move. The relative advantage prior to the computer-based player's move is referred to herein as a pre-move value (and elsewhere herein as a pre-action value). The relative advantage after the computer-based player's move is referred to as a post-move value (and elsewhere herein as a post-action value). The terms move and action are used herein interchangeably.

At step 76, a pre-move value corresponding to the relative advantage between the computer-based player B and a real person player A is identified. At step 78, the evaluation system 52 identifies and rates all possible moves by the computer based player B using conventional methods, such as those practiced in conventional chess engines. By possible move, it is meant all moves permissible by the game rules 62. Each possible move may have an impact by altering the relative advantage between the players. Some moves may result in no change in advantage. Some moves may increase or decrease the computer player's advantage. Some moves may increase or decrease the computer player's disadvantage.

At step 80, the set of possible moves is narrowed to identify a set of allowed moves. Allowed moves refer to the moves that meet select criteria. The manner of identifying the allowed moves may vary according to the embodiment. In some embodiments every possible move is evaluated to identify whether it is an allowed move. In an alternative embodiment a more direct method of identifying the allowed moves is achieved without testing every possible move.

The criteria for determining whether a move is allowed, includes a threshold parameter. In some embodiments the criteria also includes a tolerance parameter. In another embodiment, the criteria does not include the tolerance parameter. The threshold parameter as described above with regard to FIGS. 3 and 4 defines the minimum advantage that the computer-based player is allowed to achieve based on the current move. A positive threshold value means the computer-based player has and advantage of at least the threshold magnitude for a move that meets the threshold criterion. A negative threshold value means that the computer-based player has a disadvantage of not more than the threshold magnitude for a move that meets the threshold criterion.

Where the sole criterion is the threshold parameter, the allowed moves are all moves which give the computer an advantage of at least the signed threshold value, (note that a negative advantage equals a disadvantage). Where the criteria includes the threshold parameter and a tolerance parameter, the allowed moves are all moves which give the computer an advantage of at least the signed threshold value, but no more than the tolerance value.

At step 82, one move is selected from among the set of allowed moves. At step 84, the current measure of the advantage is adjusted to correspond to the post-move advantage resulting from the selected move. At step 86, the game state 60 is updated to identify the current advantage, the board layout and the move status. The move status becomes player A's turn to move.

Referring to FIG. 6, a flow chart illustrates one embodiment of a method 80 for identifying allowed moves. The method 80 is performed for each possible move as illustrated by a 'Do construct' 88. Steps 90–98 are performed for each possible move. At step 90, the post-move value of the advantage that would arise if the tested move were played is identified. At step 92 the post move value is tested to determine whether it meets the criteria for an allowed move. The criteria have been described above as including at least a threshold parameter, and in some embodiments as also including a tolerance parameter.

In some embodiments, the tolerance parameter value varies over the course of the game based on any one or more of the following factors: transpiring of a set number of moves, every set number of moves, time duration since onset of game, periodically after each elapse of a prescribed time period. In addition or alternatively, the tolerance value may change based on the current portion of the game, the current game scene, or a personality profile accorded to computer-based player.

In some embodiments, the threshold value varies over the course of the game based on any one or more of the following factors: transpiring of a set number of moves, every set number of moves, time duration since onset of game, periodically after each elapse of a prescribed time period. In addition or alternatively, the threshold value may change based on the current portion of the game, the current game scene, a personality profile accorded to computer-based player.

In some embodiments the tolerance and/or threshold values vary over the course of the game at random. For example, the tolerance and/or the threshold values are set for a randomly determined number of moves, then change.

If the post-move value does not meet the criteria then the tested move is discarded at step 94 as not being an allowed move. If the post-move value does meet the criteria then the tested move is included at step 96 within a set of allowed moves for the current turn of the computer-based player B. At step 98 the "Do construct" evaluates whether there are any more moves to test. If there are more moves, then steps 90–98 are repeated for the next move to be tested. If there are no more moves to test, then at step 100, a determination is made of whether any allowed moves were found. If there are any allowed moves, then the method 80 is complete.

If there are no allowed moves, then at step 102 the discarded moves with the corresponding post-move value nearest to meeting the criteria are selected as the allowed moves. In one embodiment the one move nearest to meeting the criteria is selected. In another embodiment, the top m moves are selected where m is prescribed by design, selected by an operator or derived using alternative criteria. In still another embodiment, where the allowed moves identified in step 100 are less than m in number, then additional moves are selected at step 102 to achieve m allowed moves. Thus, in some embodiments at least one allowed move is identified. In other embodiments at least m allowed moves are identified.

Figure 7:
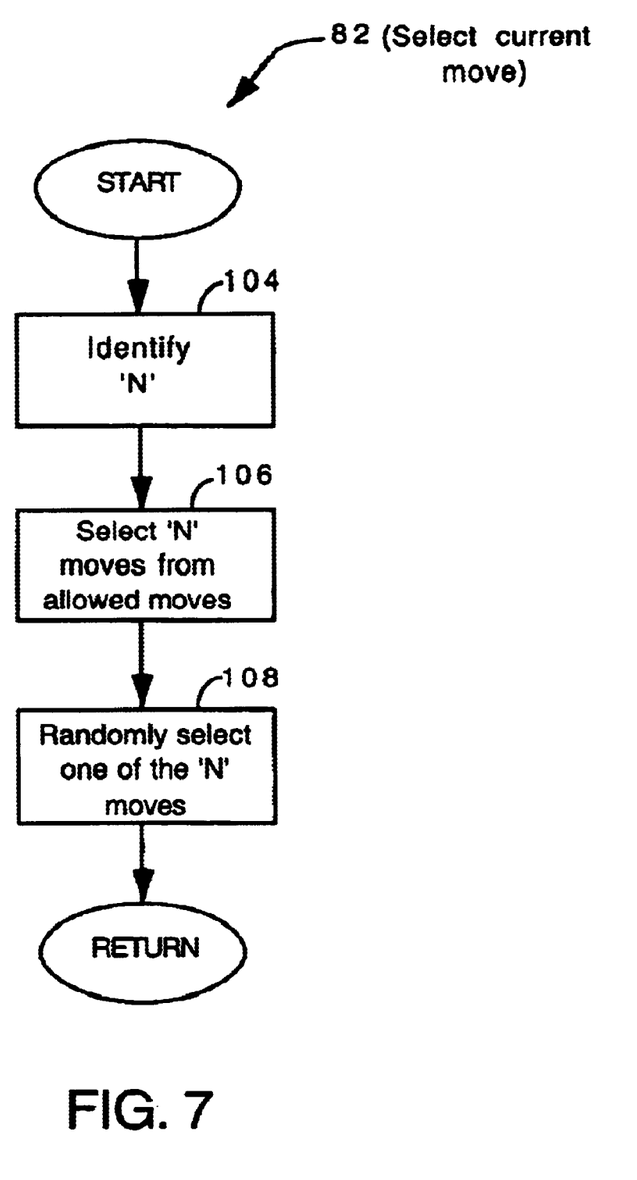
FIG. 7 is a flow chart of an embodiment of a method for selecting a move from a set of allowed moves.

There are several methods for selecting a current move from the set of allowed moves. In one embodiment, the current move for the computer-based player B is selected at random from the set of allowed moves. Referring to FIG. 7, a flow chart illustrates other embodiments of a method 82 for selecting a current move for the computer-based player B from among the set of allowed moves achieved by the process 80. At step 104 a parameter N is retrieved. In various embodiments, N is prescribed, selected or varied over the course of the game. In various embodiments, the value of N is selected based on the current portion of the game (e.g., beginning, middle or end portion), the current game scene, or a personality profile accorded to computer-based player.

At step 106, N moves are selected from the set of allowed moves. The N moves may be selected in various manners. In one embodiment, the N moves are the N moves among the allowed moves that keep the computer player B nearest to the threshold. In another embodiment, the N moves are selected randomly from the allowed moves. In another embodiment, the N moves are the middle N moves of all allowed moves. In another embodiment, the N moves are the N moves of all allowed moves that put the computer-based player at its best advantage. In another embodiment the N moves are the N moves among the allowed moves that bring or keep the computer nearest to the tolerance parameter. In another embodiment, the N moves are every other one of the allowed moves. In some embodiments the method of selecting the N candidates changes during the course of the game based on any one or more of the following factors: transpiring of a set number of moves, every set number of moves, time duration since onset of game, periodically after each elapse of a prescribed time period.

At step 108, a current move is selected from the N moves. In one embodiment the current move is a random selection. In another embodiment an algorithm is used to weight the selection making the selection less random. With the current move selected process 82 returns.

Many modifications and variations of the present invention are possible in light of the above teachings. For example, although a detailed embodiment is described for a chess game, alternative strategy games are implemented with one or more real person players and one or more computer-based players. Further, card games may be implemented in which a computer-based player's card play is selected from a set of allowed card plays using a similar method of selecting allowable plays using threshold criteria, or threshold and tolerance criteria. Similarly, a current play is selected from the set of allowed plays. As another example, in an adventure game implementation, where a character played by a real person encounters a character played by the computer (e.g., an enemy character), the result of the encounter is determined using the threshold and tolerance criteria.

As an example of a sports game, in a golf implementation, one or more real person players play against at one or more computer-based players. Evaluation is done based on score where is golf stroke is comparable to a pawn unit in the chess description. A threshold value is implemented and in some embodiments a tolerance value is implemented to determine what type of performance is to be allowed by the computer-based player for the current hole. The actual performance (i.e., number of strokes for current hole) then is determined randomly from the allowed performances, or as otherwise described above for the chess game.

In another embodiment, 8-ball pool or straight billiards is implemented where a real person player plays against a computer-based player. In this embodiment the score units are in billiard balls. The threshold value determines the computer lead. If the threshold is −2, then the computer is to trail be not more than 2 balls. For embodiments implementing a tolerance, the value determines the tolerable lead of the computer based player. When it is the computer's turn to shoot, the computer has to evaluate which ball to shoot. In this embodiment the evaluation function determines the expected number of balls that can be sunk with a specific confidence interval. For example, if first shooting at one specific ball there may be a 90% chance that 2 balls can be sunk back to back, while there is only a 30% chance that a third consecutive ball can be sunk. These odds are used to determine the computer player's possible score after shooting. For example, if the score currently is even, after the computer-based player shoots the likely score will be: $X+0.9+0.9*0.9+0.9*0.9*0.3=X+0.9+0.81+0.243=X+1.953$. For other potential balls to shoot at, there are different evaluation results. As a result, shots are not allowed if the likely number of balls would place the game score outside the threshold —tolerance criteria. The actual selection of the shot played is selected randomly from the allowed shots. Whether the ball is sunk or not is determined by the conventional game engine dynamics of the billiard game, with a fail-safe that prevents making a shot that would move the computer-based player score outside of the threshold— tolerance parameters.

In still another embodiment, bowling is implemented. In this embodiment the score units are bowling pins. The threshold and tolerance values are comparable to those for pool/billiards and chess. An evaluation is performed for each throw. The performance in the prior frames (of whether an open frame, spare or strike was played) is used with the possible results of the current throw to determine allowed outcomes. Similarly, on the second throw, the performance for the prior frames and the first throw are considered in determining the possible outcome. Of all the possible outcomes for the current roll of the ball, a subset of the results may be allowed. The actual result is determined randomly or as described analogously for the chess embodiment to determine the actual result of the current roll.

It is to be understood that, within the scope of the appended claims, the invention may be practiced otherwise than as described hereinabove.

What is claimed is:

1. A method for limiting actions of a computer-based player in a game, comprising:
   identifying a pre-action value corresponding to a relative advantage between the computer-based player and a real person player prior to a current action taken by the computer-based player;
   identifying a post-action value corresponding to the relative advantage between the computer-based player and the real person player after the current action taken by the computer-based player;
   limiting the current action to be among a set of allowed actions which keep the post-action value at least as great as a threshold value;
   selecting the current action from the set of allowed actions.

2. The method of claim 1, wherein the step of selecting comprises randomly selecting the current action from the set of allowed actions.

3. The method of claim 1, wherein the step of limiting comprises limiting the current action of the computer-based player to the set of allowed actions which keep the post-action value at least as great as the threshold value and not more than a tolerable value, where possible.

4. The method of claim 3, further comprising the step of changing the tolerance value during the game.

5. The method of claim 3, wherein the step of selecting comprises:
   selecting a prescribed number of actions from the set of allowed actions which keep the post-action value closest to the tolerance value.

6. The method of claim 5, further comprising: randomly selecting the current action from the selected actions.

7. The method of claim 5, wherein the prescribed number changes during the game based upon one factor from the group of factors including:
   transpiring of a set number of actions, time duration since onset of the game, periodically, and a current portion of the game.

8. The method of claim 5, wherein the prescribed number changes during the game based upon one factor from the group of factors including:
   a current game scene, a personality profile accorded to the computer-based player.

9. The method of claim 3, further comprising the step of:
   varying the tolerance value over the course of the game based on at least one factor from among the group of factors, including: transpiring of a set number of moves, elapsed time since onset of game, elapsed time period, and current portion of the game.

10. The method of claim 3, further comprising the step of:
    varying the tolerance value over the course of the game based on at least one factor from among the group of factors, including: a current game scene, a personality profile accorded to the computer-based player.

11. The method of claim 1, wherein the threshold value is a signed value, and wherein for the threshold value of one polarity the step of limiting keeps the computer-based player from being at a disadvantage by no more than the threshold value, where possible.

12. The method of claim 11, wherein when the threshold value is of another polarity the step of limiting keeps the computer-based player at a disadvantage of at least the threshold value, where possible.

13. The method of claim 1, further comprising the step of changing the threshold value during the game.

14. The method of claim 1, wherein the step of selecting comprises:
    selecting a prescribed number of actions from the set of allowed actions.

15. The method of claim 14, further comprising: randomly selecting the current action from the selected actions.

16. The method of claim 14, wherein the step of selecting the prescribed number of actions comprises:
    selecting actions from the set of allowed actions which keep the post-action value closest to the threshold value.

17. The method of claim 14, wherein the prescribed number changes during the game based upon one factor from the group of factors including:
    transpiring of a set number of actions, time duration since onset of the game, periodically, and a current portion of the game.

18. The method of claim 14, wherein the prescribed number changes during the game based upon one factor from the group of factors including:
    a current game scene, a personality profile accorded to the computer-based player.

19. The method of claim 1, further comprising the step of:
    varying the threshold value over the course of the game based on at least one factor from among the group of factors, including: transpiring of a set number of moves, elapsed time since onset of game, elapsed time period, and current portion of the game.

20. The method of claim 1, further comprising the step of:
    varying the threshold value over the course of the game based on at least one factor from among the group of factors, including: a current game scene, a personality profile accorded to the computer-based player.

21. The method of claim 1 wherein the game is computer-based chess, and wherein the action is a move.

22. The method of claim 1 wherein the game is a computer-based adventure game and the computer-based player is a character encountered by the real-person player.

23. The method of claim 1 wherein the game is computer-based strategy game, and wherein the action is a move.

24. A method for limiting moves by a computer-based player in a chess game, comprising:
    identifying a pre-move value corresponding to a relative score between the computer-based player and a real person player prior to a current move taken by the computer-based player;
    identifying a post-move value corresponding to the relative score between the computer-based player and the real person player after the current move taken by the computer-based player;
    limiting the current move of the computer-based player to be among the set of allowed moves which keep the post-move value of the score at least as great as the threshold value and not more than a tolerance value, where possible;
    selecting the current move from the set of allowed moves.

25. The method of claim 24, wherein the step of selecting comprises randomly selecting the current move from the set of allowed moves.

26. The method of claim 24, wherein the step of selecting comprises randomly selecting the current move from a derived subset of the allowed moves, wherein the derived subset is the subset which keeps the post-move value nearest to the threshold value.

27. The method of claim 24, wherein the step of selecting comprises randomly selecting the current move from a derived subset of the allowed moves, wherein the derived subset is the subset which keeps the post-move value nearest to the tolerance value.

28. A computer readable storage media containing executable computer program instructions which when executed cause a digital processing system to perform a method comprising:
    identifying a pre-action value corresponding to a relative advantage between a computer-based player and a real person player prior to a current action taken by the computer-based player;
    identifying a post-action value corresponding to the relative advantage between the computer-based player and the real person player after the current action taken by the computer-based player;
    limiting the current action of the computer-based player to be among the set of allowed actions which keep the post-action value of the score at least as great as the threshold value and not more than a tolerance value, where possible; and
    selecting the current action from the set of allowed actions.

29. The storage media of claim 28, wherein the step of selecting comprises randomly selecting the current action from a derived subset of the allowed actions, wherein the derived subset is the subset which keeps the post-action value nearest to the threshold value.

30. The storage media of claim 28, wherein the step of selecting comprises randomly selecting the current action from a derived subset of the allowed actions, wherein the derived subset is the subset which keeps the post-action value nearest to the tolerance value.

31. An interactive game system comprising:
- means for identifying a pre-action value corresponding to a relative advantage between a computer-based player and a real person player prior to a current action taken by the computer-based player;
- means for identifying a post-action value corresponding to the relative advantage between the computer-based player and the real person player after the current action taken by the computer-based player;
- means for limiting the current action of the computer-based player to be among the set of allowed actions which keep the post-action value of the score at least as great as the threshold value and not more than a tolerance value, where possible; and
- means for selecting the current action from the set of allowed actions.

32. The interactive game system of claim 31, wherein the means for selecting comprises means for randomly selecting the current action from a derived subset of the allowed actions, wherein the derived subset is the subset which keeps the post-action value nearest to the threshold value.

33. The interactive game system of claim 31, wherein the means for selecting comprises means for randomly selecting the current action from a derived subset of the allowed actions, wherein the derived subset is the subset which keeps the post-action value nearest to the tolerance value.

* * * * *